Oct. 10, 1944.    W. T. STEPHENS    2,359,802
HOLLOW PLUNGER CONTROL VALVE
Filed Aug. 21, 1943    3 Sheets-Sheet 1
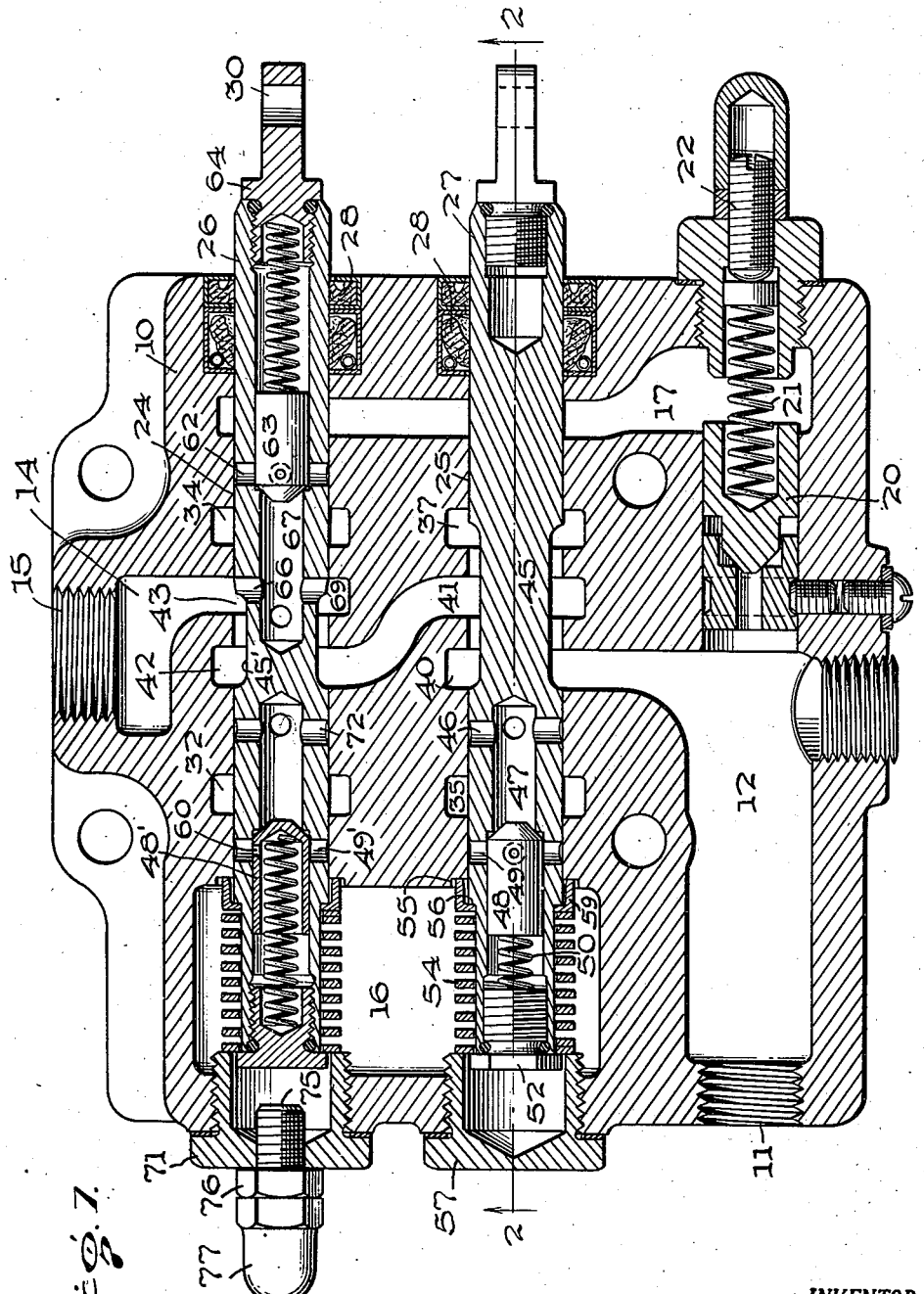
INVENTOR.
WILLIAM T. STEPHENS
BY
Leech & Radue
ATTORNEYS

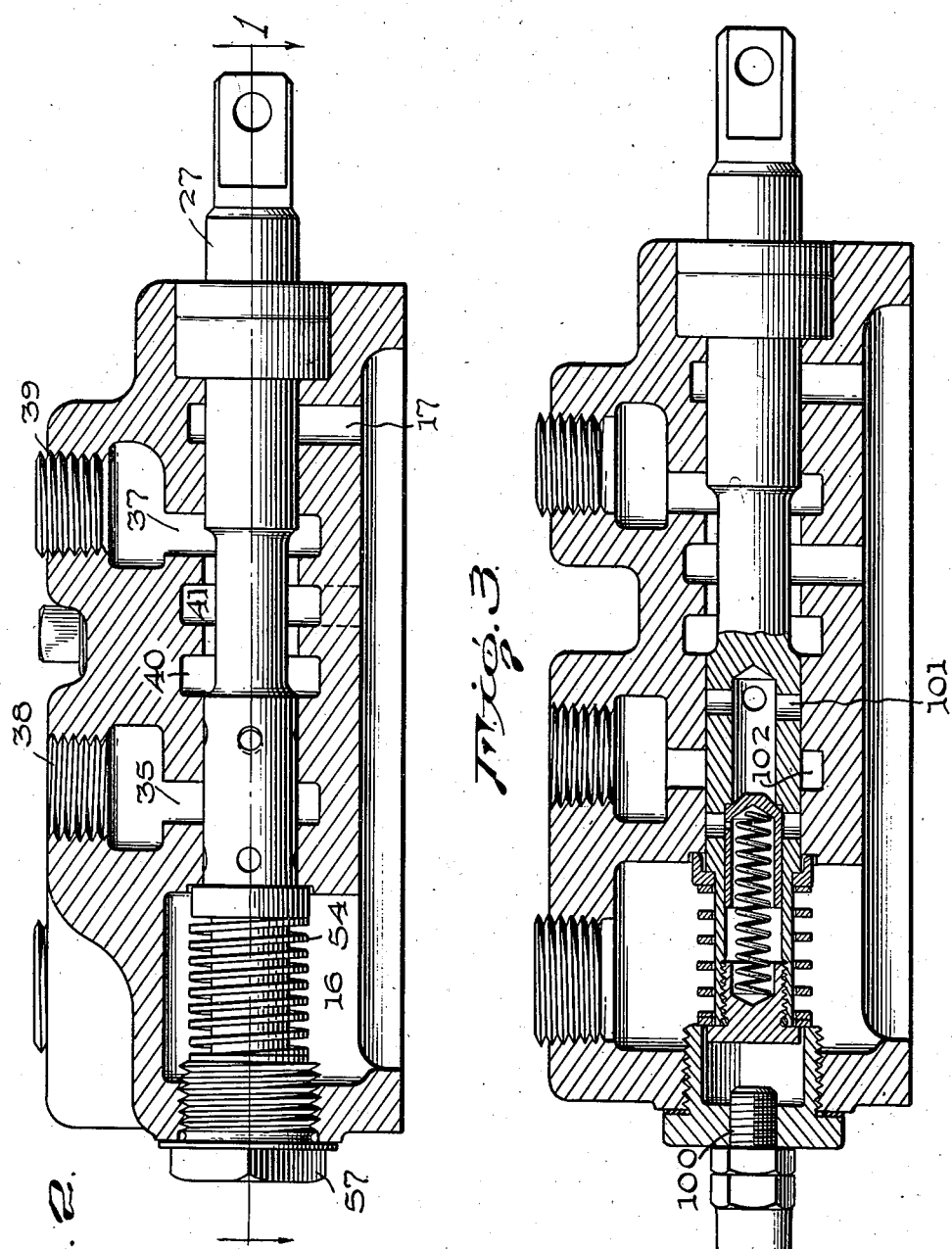

Oct. 10, 1944.  W. T. STEPHENS  2,359,802
HOLLOW PLUNGER CONTROL VALVE
Filed Aug. 21, 1943  3 Sheets-Sheet 3

INVENTOR.
WILLIAM T. STEPHENS
BY
Leech & Radue
ATTORNEYS

Patented Oct. 10, 1944

2,359,802

UNITED STATES PATENT OFFICE 2,359,802

HOLLOW PLUNGER CONTROL VALVE

William T. Stephens, Cleveland, Ohio, assignor to Hydraulic Control Engineering Company, Cleveland, Ohio, a corporation of Ohio Application August 21, 1943, Serial No. 499,544

12 Claims. (Cl. 121—46.4)

This invention relates to valves and more particularly to control valves for hydraulic systems wherein liquid under pressure is controlled for admission to a hydraulic motor, hoist or ram for moving the same and in which provision is made for controlled releasing the liquid to permit the return of the movable portion of the motor device to its initial position.

In such hydraulic systems the liquid is customarily placed under extremely high pressure by some form of constantly driven, positive-displacement pump which draws its supply of liquid from a tank, reservoir or sump. When there is no demand from the high-pressure side of the system fluid must be vented to the low-pressure or "return-to-reservoir" side of the system to prevent damage to the pump and/or wastage of power. This can and has been effected by the use of relief valves set to open at a specified pressure but the use of such valves is not entirely satisfactory since they require the operation of the pump at full working pressure to keep them open.

The control valves of the present invention provide for automatic by-pass from the high pressure to the low pressure side of the system at substantially zero pressure when set in the neutral position. They may also be equipped with or augmented by suitable relief valves designed to function when the motor load reaches its limit of movement or is greater than is capable of being moved at the maximum pressure desired in the system. Such valves will only function when the control valve, or valves, is set to the lift or hoist position thereby closing off the neutral bypass.

It is one of the objects of the present invention to provide a novel arrangement of passages in the valve housing and ports in the valve plunger permitting extreme simplification and providing for the automatic neutral bypass as just described.

When the ram, hoist or motor is heavily loaded on the downward or return stroke it is required that accurate control of the speed of return or lowering be available to the operator so as to prevent damage to the equipment and/or load and it is therefore one of the objects of the present invention to provide for regulated lowering speed in accordance with several embodiments of the invention. All of these embodiments permit manual control to provide any desired lowering speed and one embodiment also provides for a fixed or predetermined additional lowering speed while other embodiments offer adjustable lowering speeds each of which becomes fixed in accordance with any one setting of the adjusting device.

Incorporated with the features mentioned above and to some extent on which they are dependent are such features as hollow control valves with interior passages through which the fluid flows both on the hoist and lowering operations and check valves built into the control valve plungers positively preventing undesired lowering in the event of failure of the pump during a hoisting operation, or the breakage of high pressure liquid lines during such operation.

Other and further objects and features of the invention will be more apparent to those skilled in the art upon a consideration of the accompanying drawings and following specification wherein are disclosed several exemplary embodiments of the invention with the understanding that such changes, combinations and modifications of the same may be made as fall within the scope of the appended claims without departing from the spirit of the invention.

In said drawings:

Fig. 1 illustrates a section taken on the plane of the axes of the valve plungers in a multiple plunger control valve constructed in accordance with the present invention the view being a section on line 1—1 of Fig. 2;

Fig. 2 is a section taken on line 2—2 of Fig. 1 through the axis of the single-acting control valve plunger;

Figure 4:
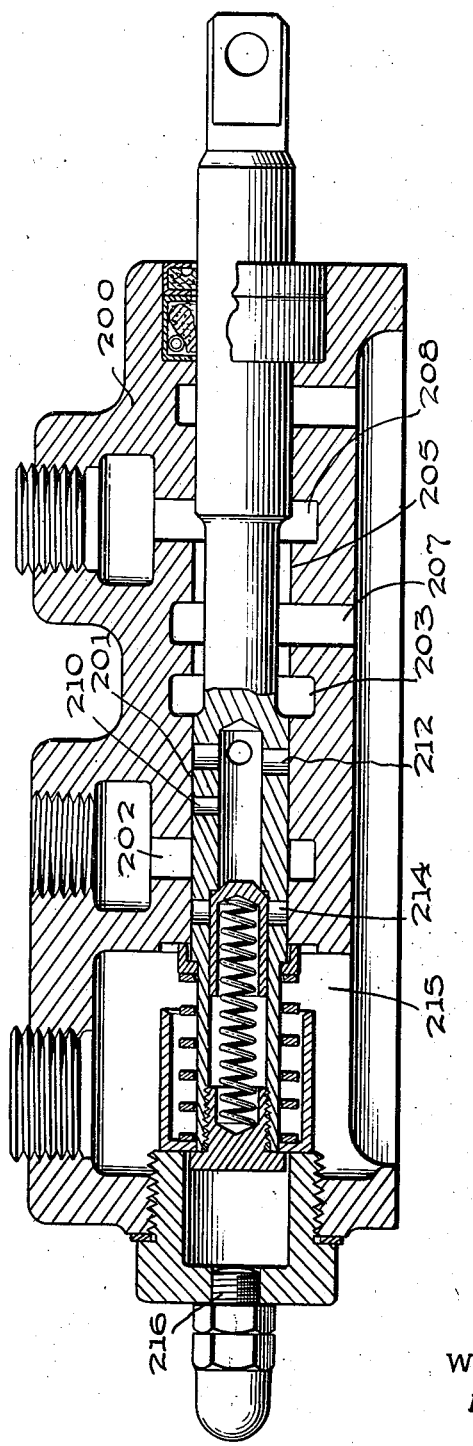

Fig. 3 is a view similar to Fig. 2 illustrating the arrangement of an adjustable stop for controlling the rate of lowering of a hoist or ram; and Fig. 4 is a view similar to Fig. 2 illustrating a form of valve plunger provided with a fixed lowering orifice in addition to lowering orifices permitting manual regulation of the rate of lowering, the latter being subject to cooperation with an adjustable stop if desired.

The valves illustrated in the several figures of the drawings may be used singly or in multiple banks either in unitary housings or in an arrangement wherein each plunger has its own housing section, and the several sections are arranged to be combined in bank for cooperation. In this latter arrangement the high and low pressure passages in the housing sections extend through the side walls of the same for cooperation with corresponding passages in the adjacent sections. The forms of valve housings illustrated for the sake of convenience are intended for mounting on top of the liquid tank or reservoir and they therefore illustrate low pressure ports and passages opening through the bottom thereof for direct return of liquid to the reservoir. It is obvious that these ports and passages could be ganged and connected by piping to any suitable and separate reservoir in an obvious manner without departing from the spirit of the invention.

Referring now to the multiple valve of Fig. 1, the housing is illustrated at 10 having an inlet 11 leading to a high pressure chamber 12 to which high pressure liquid is continuously delivered from the pump (not shown) as explained. There is also illustrated a low pressure chamber 14 having an outlet 15 for return to the reservoir or directly to the pump. Chamber 14 and its port 15 may be omitted in which case passage 43 will extend into the low pressure chamber beneath the valve and shown in Fig. 2 as joining passages 16 and 17. This construction is anticipated by the dotted lines below passage 41 in Fig. 2 and in solid lines in Fig. 3. This alternate method of construction is suitable only for use with a single plunger valve or for the last plunger of a multiple plunger valve, i. e., the one farthest removed from the high pressure fluid entrance. Additional low pressure chambers 16 and 17 communicate directly with the reservoir as previously described and clearly illustrated in Figure 2.

A relief valve of the spring pressed type is shown at 20 and provides for escape of fluid from the high pressure chamber 12 to the low pressure chamber 17 when the pump pressure becomes greater than a predetermined value, as set by the relief valve spring 21 under the control of its adjusting screw 22.

A pair of cylindrical valve passages 24 and 25 are bored lengthwise through the housing in parallel relation to each accommodate a sliding or reciprocable valve plunger 26 or 27. Each of the valve bores terminates in the common low pressure chamber 16 and passes through the narrow low pressure chamber 17 near the opposite end. Suitable packing 28 is provided for the right hand ends of the plungers where they emerge from the housing and these packings are never subject to any high pressure liquid since any which might escape longitudinally along the valve bores would return through 17 to the reservoir. The right hand ends of the valve plungers are provided with operating eyes 30 for appropriate connection to any desired manual control levers. Each of the valves is shown in the neutral position.

Each valve bore intersects two separate motor control ports, those associated with valve plunger 26 being numbered 32 and 34 respectively, while those associated with valve plunger 27 are numbered 35 and 37 respectively. In Fig. 2 these motor ports are shown communicating with outlets 38 and 39, the latter being plugged since the valve plunger in this particular case is of the single acting type. It is convenient to form the housing with appropriate passages, ports and the like for double acting plungers and, to convert, where desired, to single action by a mere change in the construction of the plunger and appropriate plugging of the unused motor port.

The high pressure chamber 12 has a passage 40 extended therefrom to intersect the valve bore 25. Offset from this, a passage 41 also intersects the bore 25 and extends in a curved path to intersect the bore 24 at 42 in alignment with the high pressure intersection 40. An extension of the low pressure chamber 14 intersects the bore 24 at 43 in alignment with 41. Passages 43 and 41 are spaced a less distance from the motor ports 34 and 37 respectively than are 42 and 40 from motor ports 32 and 35, the reasons for which will appear as the description of the valve plungers proceeds.

Valve plunger 27 is constructed for use with one single acting hoist in which liquid is admitted to one side only of the plunger to lift the same and is released therefrom for lowering purposes. The plunger comprises a cylindrical rod closely fitting the bore and having a reduced diameter portion 45 which, in neutral position, spans between 40 and 37 and separates the lands, or full diameter parts at the two ends of the valve. Motor port 37 it will be remembered is plugged off as shown at 39 in Fig. 2 so that, with the single acting valve in neutral position, high pressure liquid entering at 12 passes from 40 to 41 unobstructed. When the double acting valve plunger is also in the neutral position this liquid bypasses from 42 to 43 and returns to the reservoir by way of 14 so that the pump does not work against any pressure.

When hoisting is to take place valve plunger 27 is moved to the right until the land to the left of 45 closes off or fills the bore between 40 and 41. This brings the radial ports 46 into registry with 40 and high pressure fluid flows into them and thence to the longitudinal passage 47 in the valve plunger, the left end of which is closed by a check valve plunger 48 operating in a counterbore slightly larger than 47. This check plunger normally closes off the counterbore and radial ports 49 from communication with passage 47 and is held in this position by a light spring 50 positioned in the main valve plunger by the end plug 52 which also serves to seal the passage 47 against discharge out through the end of the valve.

When radial ports 46 register with high pressure passage 40, radial ports 49 register with motor passage 35 and the high pressure fluid forces open the check valve and flows freely into 35 and hence to the motor or hoist to actuate the same.

When the hoist has reached its desired position it may be held there by returning the valve plunger to neutral position, thus shutting off return from the motor port and again providing free bypass for the high pressure fluid from the pump. It will be noted that during the hoisting operation if the high pressure fluid should cease to flow for any reason such as stoppage of the pump or breaking of the pipe line the hoist could not fall since fluid would be prevented from returning from 35 into 49 and thence to 47 by the automatic closing of the check valve 48.

For lowering the hoist the valve plunger is moved to the left of the neutral position until radial passages 46 register with motor port 35 and radial passages 49 open into low pressure chamber 16. The liquid from the hoist then returns, forcing the check valve open and is discharged to the reservoir. The rate of return can be controlled by the operator in accordance with the extent of registry of ports 46 with the motor port 35, and to provide for simple and accurate regulation it will be noted that the several ports 46 which extend radially through the walls of the valve plunger are arranged along a helix, the total extent of which is not greater than the length of port 35 in the direction of movement of the valve. In this manner any degree of registry, from zero to maximum, between ports 46 and passage 35 can be effected and the rate of lowering, which sometimes takes place under heavy load, can be nicely controlled.

To assure the automatic return of the valve plunger to the neutral position from either direction of movement it is equipped with a helical centering spring 54 surrounding a reduced diameter thereof at the left end. The right end of the spring abuts against a cup shaped collar 59 whose outer edge abuts against the shoulder 55 in the housing and whose inner surface abuts against a shoulder 56 on the plunger while the left end of the spring abuts against the inner end of the plug 57 which closes off the housing and is hollow for movement of the plunger therein. The spring also bears against the extended head of the plug 52 closing the valve plunger. It will be seen with this construction that the valve can be moved in either direction and will compress the spring and condition the same to return the valve to its neutral position.

The reduced diameter 45 of the valve is of such length that when the latter is moved to the left for lowering the hoist, the right hand land does not close off the passage between 40 and 41. This provides free bypass for the high pressure liquid and also permits it to have access to the other valve plunger which can thus be set for hoisting while the first valve plunger is set for lowering.

In the case of the double acting valve whose plunger is numbered 26, the valve bore and all of the fluid passages are identical with those described in connection with valve plunger 27. This permits interchangeability as previously described. The valve plunger however is arranged to have substantially duplicate ends, each end including the pair of radial port sets communicating with the longitudinal passage and the check valve for closing off one set of radial ports from its individual passage.

The left hand portion of valve plunger 26 will be seen to be identical with that in plunger 27, but because of the cross sectioning of the check valve plunger 48' in the drawings it is more readily noticeable that this is a hollow tube having a tapered seating end and that a portion of the spring is housed within the plunger providing for greater length and resiliency. It will also be noted that the check valve plunger body is provided with at least one radial perforation 60 which is normally in line with one of the radial bores 49' in the main valve plunger to permit the freeing of any liquid which may leak past the valve plunger and be trapped behind the same. Without this bleed port the plunger could become locked closed. This port 60 also insures the valve remaining closed on attempted reverse flow through the valve for it permits access of liquid under pressure against its back face.

The opposite end of valve plunger 26 includes radial ports 62 controlled by the check valve plunger 63, identical in construction to that already described. Its spring is somewhat longer because of structural requirements and is held in place by the end cap 64 which carries the operating eye 30 for the whole plunger.

The second set of radial passages 66 which communicate with the longitudinal bore 67 of the right hand end of plunger 26 are however located at the shoulder or junction 69 between the right hand land and the reduced diameter portion 45'. This portion 45' is not so long as illustrated in the single acting valve but has a longitudinal extent only equivalent to the space between the left wall of passage 42 and the right wall of passage 43. This insures closing off of motor passage 34 when the valve is in the neutral position as shown.

It will of course be readily apparent that the longitudinal passages in the valve plunger for the two ends of the same are entirely independent. In the left hand end the arrangement of the ports and passages is identical with that described in connection with the single acting valve but at the right hand end there is a distinction caused by the location of the radial passages 66. Instead of being closed when the valve is in the neutral position these are in register with the extension 43 of low pressure chamber 14. Because they are at the shoulder and a portion of their area, at least, opens through the larger diameter of the valve high pressure liquid in full volume can be delivered to the motor port 34 only after all radial passages 66 are completely out of register with passage 43 when the valve plunger is moved toward the left. This liquid is delivered through 67 and 62 into the motor port 34 for operating the opposite end of a double acting hoist the other end of which is associated with the left end of the valve, or for lifting one of a pair of single acting hoists which may be connected for opposite movement and control by the one double acting valve plunger.

The amount of plunger displacement toward the left necessary to seal off communication between 42 and 43 and provide high pressure liquid to motor port 34 is equivalent to the amount necessary to connect left hand motor port 32 to its radial plunger passages 72 so that liquid may discharge from the opposite end of the double acting hoist or from the other of two hoists associated with the double acting valve.

The cap 71 in the housing at the left end of the upper valve bore may be provided, if desired, with a regulating stop to limit the amount of movement of the valve plunger toward the left so that control may be had of the rate of lowering of the hoist associated with the left hand portion of the valve. This may be adjusted to determine the amount of lap of the helically arranged radial ports 72 with the motor port 32. It may conveniently consist of a screw 75 having threaded engagement with a suitable aperture in the head of the cap and fitted with a lock nut 76 and cap nut 77 to prevent leakage. The adjustment may be set to any predetermined value so that a relatively fixed rate of lowering of the hoist associated with the same may be effected. It will be noted that this will have a corresponding degree of regulation of raising of the hoist connected with the other end of the same valve plunger since it will regulate the degree of overlap between plunger ports 62 and motor port 34 although the valve may be so designed that this latter is not possible.

Obviously identical regulating means may be applied to the other valve stem or to both of them if desired. Fig. 3 shows a valve substantially identical with any one of those in Fig. 1 and illustrates more clearly the arrangement of the stop screw or lowering limit adjustor when combined with a single acting valve plunger. The setting illustrated for the stop screw 100 will be seen to permit only a partial over lap of the lowermost and left hand radial port 101 with motor port 102 so that relatively slow lowering will be effected. Adjustment of the screw in one direction or the other will change the amount of possible overlap so that a desired rate of lowering for any particular load can be duplicated by the operator by the simple means of moving the valve toward the left until it is stopped by the adjusting screw. It will be apparent that, where desired, a similar stop may be made to cooperate with the opposite end of the valve by which arrangement the rate of hoisting with a single acting plunger or the rate of lowering of the opposite end with the double acting plunger may be controlled. The presence of the adjusting means does not prevent manual regulation of the rate of lowering so that it can be less than that predetermined by the stop.

In Fig. 4 the structure of the valve housing is identical with that illustrated in Figs. 2 and 3, except that the overall length of the housing 200 is somewhat enhanced in order to provide a greater spacing at 201, between the left hand motor port 202 and the high pressure passage 203, for purposes which will presently appear. In the event that a double acting plunger should be incorporated with this type of housing there is also an increased length at 205 between low pressure passage 207 and right hand motor port 208.

These additional spacings provide room for an auxiliary radial port 210 in the valve plunger intermediate the staggered radial lowering ports 212 and the check valve control ports 214. This auxiliary port 210 has a predetermined maximum flow rate for the pressures usually encountered and is initially designed to limit the rate of lowering of the hoist associated therewith in accordance with some predetermined desideratum.

It will be remembered that the check valve controlled passages, when they once pass the end of the bore, are free to discharge in the space occupied by the valve spring, which leads to the low pressure chamber 215, so that any degree of overlap is permitted toward the left. It is desired that the valve operator be provided with a suitable detent to indicate the neutral position and a position of full overlap of the auxiliary port 210 with the motor port 202 so that the operator can readily determine when he has set the valve for controlled lowering. If a faster rate of lowering is desired, or one which can be manually controlled by the operator, the plunger is moved still further to the left, covering port 210 between the motor port 202 and the low pressure chamber 215 and bringing the helically arranged main lowering ports 212 into the desired degree of register with the motor port 202 thereby giving the operator the same degree of control over the rate of lowering as he would have had in the total absence of the auxiliary port 210. This form of valve is likewise provided with an adjustable stop screw 216 which may be set so that the operator has only the option of using the predetermined lowering port 210 or of using only a limited portion of the main lowering ports 212 all in accordance with desired conditions.

If a double acting valve plunger is to be used with this form of housing the opposite end will of course have an auxiliary or predetermined lowering port in the corresponding position between its two sets of main radial ports leading to the longitudinal passage in the right end of the valve. Where a double acting plunger is provided with any one of the control means shown or described and is connected to operate with a double acting hoist it will be seen that control of the rate of escape of liquid from one side of the hoist plunger will regulate its rate of movement and hence the rate of delivery of liquid to the opposite side thereof. If this rate is less than the pump capacity the relief valve will open to handle the excess.

What I claim is:

1. In a valve for controlling the flow of liquid for a hydraulic hoist, in combination, a housing having a cylindrical valve bore, a passage in said housing for connection to a source of high pressure liquid, a second passage for connection to a liquid sump, said passages intersecting said bore closely adjacent but spaced from each other, a passage for connection to a hoist and intersecting the bore spaced from the first passages, a valve plunger slidable in and closely fitting said bore, said plunger having a portion of reduced diameter positioned to span and connect the first two passages when in the neutral position, said plunger having a longitudinal bore extending between and connecting radial ports spaced apart therein a distance substantially equal to the spacing between the high pressure and hoist passages, a check valve operable in said plunger bore and biased to prevent flow from one radial port to the plunger bore, the other radial port being always open to the plunger bore, said check valve controlled port being positioned between the hoist passage and a sump passage when the plunger is in neutral position and being adapted to be positioned to cooperate with either.

2. In a valve for controlling the flow of liquid for a hydraulic hoist, in combination, a housing having a cylindrical valve bore, a chamber in said housing for connection to a source of high pressure liquid, a second chamber for connection to a liquid sump, a passage from each said chambers intersecting said bore closely adjacent but spaced from each other, a passage for connection to a hoist and intersecting the bore spaced from the first passages, a valve plunger slidable in and closely fitting said bore, said plunger having a portion of reduced diameter positioned to connect the first two passages when in the neutral position, said plunger having a longitudinal bore extending between and connecting radial ports spaced apart therein a distance substantially equal to the spacing between the high pressure and hoist passages, a check valve operable in said plunger bore and biased to permit flow only in the direction from the plunger bore to one radial port, the other radial port being always open to the plunger bore, said check valve controlled port being positioned between the hoist passage and a sump passage when the plunger is in neutral position and being adapted to be positioned to cooperate with either, the uncontrolled radial port being adapted to register with the high pressure passage when the check valve controlled port registers with the hoist passage the uncontrolled radial port being adapted to cooperate with the hoist passage when the check valve controlled port registers with a sump passage and means to limit the degree of said cooperation to regulate the rate of hoist lowering.

3. In a valve for controlling the flow of liquid for a hydraulic hoist, in combination, a housing having a cylindrical valve bore, a passage in said housing for connection to a source of high pressure liquid, a second passage for connection to a liquid sump, said passages intersecting said bore closely adjacent but spaced from each other a passage for connection to a hoist and intersecting the bore spaced from the first passages, a valve plunger slidable in and closely fitting said bore, said plunger having a portion of reduced diameter positioned to connect the first two passages when in the neutral position, said plunger having a longitudinal bore extending between and connecting radial ports spaced apart therein a distance substantially equal to the spacing between the high pressure and hoist passages, a check valve operable in said plunger bore and biased to permit flow only in the direction from the plunger bore to one radial port, the other radial port being always open to the plunger bore, said check valve controlled port in the neutral position being stationed between the hoist passage and a sump passage for movement to cooperate with either, the uncontrolled port being correspondingly stationed in respect to the high pressure and hoist passages and means to provide for a predetermined rate of liquid flow from the hoist through the valve to the sump whereby the rate of hoist lowering can be accurately controlled.

4. In a valve for controlling the flow of liquid for a hydraulic hoist, in combination, a housing having a cylindrical valve bore, a chamber in said housing for connection to a source of high pressure liquid, a second chamber for connection to a liquid sump, a passage from each said chambers intersecting said bore closely adjacent but spaced from each other, a passage for connection to a hoist and intersecting the bore spaced from the first passages, a valve plunger slidable in and closely fitting said bore, said plunger having a portion of reduced diameter positioned to connect the first two passages when in the neutral position, said plunger having a longitudinal bore extending between and connecting radial ports spaced apart therein a distance substantially equal to the spacing between the high pressure and hoist passages, a check valve operable in said plunger bore and biased to permit flow only in the direction from the plunger bore to one radial port, the other radial port being always open to the plunger bore, said check valve controlled port in the neutral position being stationed between the hoist passage and a sump passage for movement to cooperate with either, the uncontrolled port being correspondingly stationed in respect to the high pressure and hoist passages and having its leading edge shaped for progressive cooperation with the hoist passage and means to adjustably limit movement of the valve plunger to predetermine the amount of said cooperation.

5. In a valve for controlling the flow of liquid for a hydraulic hoist, in combination, a housing having a cylindrical valve bore, a chamber in said housing for connection to a source of high pressure liquid, a second chamber for connection to a liquid sump, a passage from each said chambers intersecting said bore closely adjacent but spaced from each other, a passage for connection to a hoist and intersecting the bore spaced from the first passages, a valve plunger slidable in and closely fitting said bore, said plunger having a portion of reduced diameter positioned to connect the first two passages when in the neutral position, said plunger having a longitudinal bore extending between and connecting radial ports spaced apart therein a distance substantially equal to the spacing between the high pressure and hoist passages, a check valve operable in said plunger bore and biased to permit flow only in the direction from the plunger bore to one radial port, the other radial port being always open to the plunger bore, said check valve controlled port in the neutral position being stationed between the hoist passage and a sump passage for movement to cooperate with either, the uncontrolled port being correspondingly stationed in respect to the high pressure and hoist passages and having its leading edge shaped for progressive cooperation with the hoist passage and a restricted radial lowering port leading to the plunger bore intermediate the controlled and uncontrolled ports for cooperation with the hoist passage to provide a predetermined limited lowering rate.

6. In a valve for controlling the flow of liquid for a hydraulic hoist, in combination, a housing having a cylindrical valve bore, a chamber in said housing for connection to a source of high pressure liquid, a second chamber for connection to a liquid sump, a passage from each said chambers intersecting said bore closely adjacent but spaced from each other, a passage for connection to a hoist and intersecting the bore spaced from the first passages, a valve plunger slidable in and closely fitting said bore, said plunger having a portion of reduced diameter positioned to connect the first two passages when in the neutral position, said plunger having a longitudinal bore extending between and connecting radial ports spaced apart therein a distance substantially equal to the spacing between the high pressure and hoist passages, a check valve operable in said plunger bore and biased to permit flow only in the direction from the plunger bore to one radial port, the other radial port being always open to the plunger bore, said check valve controlled port in the neutral position being stationed between the hoist passage and a sump passage for movement to cooperate with either, the uncontrolled port being correspondingly stationed in respect to the high pressure and hoist passages and having its leading edge shaped for progressive cooperation with the hoist passage, a closure plug for one end of the valve bore and an adjustable stop screw in said plug to regulate the stroke of the plunger in the lowering direction.

7. In a valve for controlling the flow of liquid to and from a hydraulic hoist, in combination, a housing having a cylindrical valve bore, a passage in said housing for connection to a source of high pressure liquid, a second passage for connection to a liquid sump, said passages intersecting said bore closely adjacent but spaced from each other, a passage for connection to a hoist and intersecting the bore spaced from the first passages, a valve plunger closely fitting said bore and slidable each way from a neutral position, said plunger having a restriction to connect the first two passages when in the neutral position, said plunger having a longitudinal bore extending to connect radial ports spaced therein a distance substantially equal to the spacing between the high pressure and hoist passages, a check valve biased in said plunger bore to prevent flow from one radial port to the plunger bore, the other radial port being always open to the plunger bore, said check valve controlled port when in the neutral position being stationed between the hoist passage and a sump passage for movement to cooperate with either, the uncontrolled port being correspondingly stationed in respect to the high pressure and hoist passages and having its leading edge shaped for progressive cooperation with the hoist passage and a stop carried by said housing and adjustable to limit movement of the plunger to determine the amount of said cooperation to regulate the rate of lowering of the hoist.

8. In a valve for controlling the flow of liquid for a hydraulic hoist, in combination, a housing having a cylindrical valve bore, a passage in said housing for connection to a source of high pressure liquid, a second passage for connection to a liquid sump, said passages intersecting said bore closely adjacent each other, a passage for connection to a hoist and intersecting the bore spaced from the first passages, a valve plunger closely fitting said bore and slidable each way from a neutral position, said plunger having a restriction to connect the first two passages when in the neutral position, said plunger having a longitudinal bore connecting radial ports spaced therein a distance substantially equal to the spacing between the high pressure and hoist passages, a check valve biased in said plunger bore to prevent flow from one radial port to the plunger bore, the other radial port being always open to the plunger bore, said check valve controlled port when in the neutral position being stationed between the hoist passage and a sump passage for movement to cooperate with either, the uncontrolled port being correspondingly stationed in respect to the high pressure and hoist passages, said plunger having a third radial port of predetermined limited area to regulate the rate of hoist lowering, said third port being positioned between the first two so as to alone cooperate with the hoist passage when the check valve controlled port first registers with a sump passage.

9. In a valve for controlling the flow of liquid for a hydraulic hoist, in combination, a housing having a valve bore, a passage in said housing for connection to a source of high pressure liquid, a second passage for connection to a liquid sump, said passages intersecting said bore closely adjacent each other, a passage for connection to a hoist intersecting the bore spaced from the first passages, a valve plunger closely fitting said bore and movable each way from a neutral position, said plunger having a groove to connect the first two passages when in the neutral position, said plunger having a longitudinal bore connecting radial ports spaced therein a distance substantially equal to the spacing between the high pressure and hoist passages, a check valve biased in said plunger bore to prevent flow from the radial port remote from the high pressure passage to the plunger bore but not vice versa, the other radial port being always open to the plunger bore, said check valve controlled port when in the neutral position being stationed between the hoist passage and a sump passage for movement to cooperate with either, the uncontrolled port being correspondingly stationed in respect to the high pressure and hoist passages and having its leading edge shaped for progressive cooperation with the hoist passage to provide restricted or unrestricted hoist lowering, a third port in said valve plunger intermediate the first two and adapted to alone cooperate with the hoist passage when the valve controlled port first registers with a sump passage, said third port having a definite restricted size to provide a predetermined rate of hoist lowering.

10. In a valve for controlling the flow of liquid for a hydraulic hoist, in combination, a housing having a cylindrical valve bore, a passage in said housing for connection to a source of high pressure liquid, a second passage for connection to a liquid sump, said passages intersecting said bore closely adjacent but spaced from each other, a spaced pair of passages for connection to a double acting hoist and intersecting the bore on opposite sides of and equally spaced from the first passage, a valve plunger closely fitting said bore and movable each way from a neutral position, said plunger having a portion of reduced diameter just long enough and positioned to connect the first two passages when in the neutral position, said plunger having a pair of spaced longitudinal bores each extending between and connecting radial ports spaced apart therein a distance substantially equal to the spacing between the high pressure and the corresponding hoist passage, a check valve biased in each of said plunger bores to prevent flow from the radial port remote from the high pressure passage to the plunger bore but not vice versa, the other radial port being always open to its plunger bore, said check controlled ports in the neutral plunger position being stationed between the corresponding hoist passage and a sump passage for movement to cooperate with either, the uncontrolled ports being correspondingly stationed in respect to the high pressure and hoist passages, one of said uncontrolled plunger ports being located in the said sump passage when the plunger is in neutral position, said port being at the junction of the main and reduced diameters of the plunger.

11. In a valve for controlling the flow of liquid for a double acting hydraulic hoist, in combination, a housing having a cylindrical valve bore extending through one end of the same, a passage in said housing for connection to a source of high pressure liquid, a second passage for connection to a liquid sump, said passages intersecting said bore closely adjacent but spaced from each other, two spaced passages for connection to opposite ends of said hoist and intersecting the bore at equal distances on opposite sides of the first passage, a valve plunger closely fitting said bore and movable each way from a neutral position, said plunger having a portion of reduced diameter just long enough and located when in the neutral position to connect the first two passages, said plunger having a pair of spaced longitudinal bores each extending between and connecting radial ports spaced apart therein a distance substantially equal to the spacing between the high pressure and the corresponding hoist passage, a check valve biased in each of said plunger bores to prevent flow from the radial port remote from the high pressure passage to the plunger bore but not vice versa, the other radial port being always open to its plunger bore, said check valve controlled ports in the neutral plunger position being stationed between the corresponding hoist passage and a sump passage and adapted to cooperate with either when moved, the uncontrolled ports being correspondingly stationed in respect to the high pressure and hoist passages, one of said uncontrolled plunger ports being located in the said sump passage when the plunger is in neutral position, said port being at the junction of the main and reduced diameter of the plunger, a plug closing the end of the valve bore and an adjustment screw in said plug adapted to engage and limit the movement of the plunger in one direction.

12. In a valve for controlling the flow of liquid for a single acting hydraulic hoist, in combination, a housing having a valve bore, a passage in said housing for connection to a source of high pressure liquid, a second passage for connection to a liquid sump, said passages intersecting said bore closely adjacent but spaced from each other, a passage for connection to the hoist and intersecting the bore on the opposite side of the first passage from the sump passage, a valve plunger closely fitting said bore and movable each way from a neutral position, said plunger having a portion of reduced diameter long enough and positioned to connect the first two passages when in the neutral and lowering positions, said plunger having longitudinal bores extending between and connecting radial ports spaced apart therein a distance substantially equal to the spacing between the high pressure and hoist passages, a check valve biased in said plunger bore to prevent flow from that radial port remote from the high pressure passage to the plunger bore but not vice versa as when the valve is in the raising position, the other radial port being always open to its plunger bore, said check controlled port in the neutral plunger position being stationed between the hoist passage and a second sump passage for movement to cooperate with either, the uncontrolled port being correspondingly stationed in respect to the high pressure and hoist passages and having its leading edge shaped for progressive cooperation with the hoist passage as the valve is moved toward the lowering position so as to regulate the rate of lowering and means to provide a predetermined rate of lowering.

WILLIAM T. STEPHENS.